(12) United States Patent
Yamashita

(10) Patent No.: US 6,960,906 B2
(45) Date of Patent: Nov. 1, 2005

(54) SWITCHING POWER SUPPLY

(75) Inventor: Tetsuji Yamashita, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 95 days.

(21) Appl. No.: 10/736,509

(22) Filed: Dec. 17, 2003

(65) Prior Publication Data
US 2004/0125620 A1 Jul. 1, 2004

(30) Foreign Application Priority Data
Dec. 20, 2002 (JP) .................................. 2002-369086

(51) Int. Cl.⁷ ............................................... G05F 1/40
(52) U.S. Cl. ........................ 323/285; 323/284; 323/275
(58) Field of Search ................................ 323/271, 282, 323/283, 284, 285, 280, 281, 351, 275, 276, 277, 901

(56) References Cited

U.S. PATENT DOCUMENTS 5,514,951 A * 5/1996 Halim et al. ................. 323/901
6,580,258 B2 * 6/2003 Wilcox et al. ............... 323/282
6,724,174 B1 * 4/2004 Esteves et al. .............. 323/284

FOREIGN PATENT DOCUMENTS

| JP | 02-168855 | 6/1990 |
| JP | 8-289542 | 11/1996 |
| JP | 10-304658 | 11/1998 |
| JP | 2001-224169 | 8/2001 |
| JP | 2002-051549 | 2/2002 |

* cited by examiner

Primary Examiner—Jessica Han
(74) Attorney, Agent, or Firm—Steptoe & Johnson LLP

(57) ABSTRACT

The present invention provides a switching power supply which reduces power consumption in a standby state and improves power supply efficiency. At the time of starting a standby mode in which the output voltage VFB of the IV converter exceeds a standby detection upper limit voltage from a reference voltage source, the switching operation of the switching element is stopped. This stopping reduces the output voltage VFB of the IV converter along with a power supply voltage VO. When the output voltage VFB is lower than a standby detection lower limit voltage from the reference voltage source, the switching operation of the switching element is resumed.

5 Claims, 10 Drawing Sheets

SWITCHING POWER SUPPLY

FIELD OF THE INVENTION

The present invention relates to a switching power supply whereby direct-current output voltage is stabilized by controlling a switching operation when the direct-current output voltage obtained by the switching operation is fed to a load.

BACKGROUND OF THE INVENTION

Conventionally switching power supplies are widely used, each serving as a power source supply installed in office automation equipment such as a personal computer. In such a power supply, switching is performed on direct-current input voltage by a switching element, alternating voltage generated by the switching operation via a transformer is rectified and smoothed to output direct-current input voltage, and when the direct-current output voltage is fed to a load, the switching operation of the switching element is controlled by a control circuit according to a change in direct-current output voltage, so that direct output voltage is stabilized.

The above conventional switching power supply (e.g., JP10-304658A) will be described below with reference to the accompanying drawings.

FIG. 7 is a circuit block diagram showing a structural example of a switching control section in the conventional switching power supply. As shown in FIG. 7, a switching control section 62 has a switching element 1 such as a power MOSFET and a control circuit for performing the switching control of the switching element 1 that are integrated on the same semiconductor substrate. The switching control section 62 is constituted of a semiconductor device (hereinafter, the switching control section will be indicated as a semiconductor device) having nine terminals of an input terminal 53 and an output terminal 54 of the switching element 1, a terminal 55 for detecting overvoltage protection and starting voltage, a power supply terminal 56 of the control circuit, a terminal 57 for detecting remote on/off and overload/overcurrent protection, a terminal 58 for detecting a heavy load, a control terminal 59 for inputting a control signal, a terminal 60 for detecting a bias winding voltage of a transformer, and a terminal 61 for connecting a capacitor which determines a switching frequency of the switching element 1.

In the semiconductor device 62, a regulator 6 connects the input terminal 53 of the switching element 1, the terminal 55 for detecting starting voltage, and the power supply terminal 56 of the control circuit. When the input terminal 53 of the switching element 1 has a voltage of a given value or higher, the internal circuit current of the semiconductor device 62 is fed and control is performed by a regulator comparator 8 so that the voltage of the power supply terminal 56 for the semiconductor device 62 has the given value. The output of a start/stop comparator 7 is inputted to an AND circuit 18, the output signal of the AND circuit 18 is inputted to a NAND circuit 51, and the resonance (switching operation) and stop of the switching element 1 are controlled according to a voltage of the terminal 55.

Reference numeral 9 denotes an overvoltage protection circuit. Voltage is detected from the bias winding of the transformer via a rectifier, so that when output voltage from the secondary side of the transformer increases too high, a NAND circuit 20 outputs a signal to the set terminal (S) of an RS flip-flop 21 and the operation of the switching element 1 is stopped in a latch mode. A return is made to the operation from overvoltage protection when a restart trigger signal 22 is outputted to the reset terminal (R) of the RS flip-flop 21.

Reference numeral 10 denotes an overheat protection circuit. When the chip temperature of the semiconductor device 62 is equal to or higher than a set value, the NAND circuit 20 outputs a signal to the set terminal (S) of the RS flip-flop 21 to stop the operation of the switching element 1. A return is made to the operation from overheat protection when the restart trigger signal 22 is outputted to the reset terminal (R) of the RS flip-flop 21.

Reference numeral 15 denotes a clamping circuit which performs control so that the terminal 57 has a potential of a constant value.

Reference numeral 17 denotes a remote on/off detection circuit. The circuit controls the potential of the terminal 57 outside the semiconductor device 62, so that the switching element 1 is forcibly stopped (remote off) or is returned to an operating state (remote on).

Since a resistor is connected to the terminal 58 from the outside of the semiconductor device 62, a constant voltage is set by a constant-current source 23. Further, the voltage is inputted to a heavy load detection circuit 24 and is set as a heavy load level.

Reference numeral 26 denotes a clamping circuit which is connected to the control terminal 59. Since a photocoupler is connected to the control terminal 59 from the outside of the semiconductor device 62, a constant potential is set on the terminal 59. Reference numeral 27 denotes an IV converter which internally converts current fed from the control terminal 59 into voltage.

A high-side clamp 30 and a low-side clamp 31 are connected to the terminal 60 for detecting the bias winding voltage of the transformer and limit voltage inputted to the inside of the semiconductor device 62. Further, a transformer reset detection circuit 32 is connected to the terminal 60. The timing of the turn-on signal of the switching element 1 is determined by a one-shot pulse generation circuit 33.

Reference numeral 19 denotes a start pulse generation circuit. Output is generated by the output signal of the start/stop comparator 7, that is, a start signal, and the output signal of the remote on/off detection circuit 17, that is, the output signal of the AND circuit 18 that is a remote signal. The output is inputted to the set terminal (S) of an RS flip-flop 43 through an OR circuit 34 and an AND circuit 68, and the output Q of the RS flip-flop 43 is inputted to the NAND circuit 51.

A capacitor is connected to the terminal 61 from the outside of the semiconductor device 62 and a potential of the terminal 61 is fixed at a certain potential by a high-side forcing clamp 38 before startup. As to the terminal 61 after startup, the output signal Q of the RS flip-flop 43 is set at H and the switching element 1 is turned on via the AND circuit 68 by a start pulse signal, or a one-shot pulse signal during a normal operation. At the same time, the potential of the terminal 61 is reduced from a high-side clamp potential.

Further, when a switch 46 is turned on by the output signal of the RS flip-flop 43, electrical charge accumulated on the terminal 61 is discharged by the constant-current source 47, and it is detected by a comparator 40 that the potential of the terminal 61 is lower than the voltage value internally converted by the IV converter 27, an N-type MOSFET 42 is turned on via an OR circuit 41 and the charge on the terminal 61 is forcibly discharged.

When it is detected by a comparator 35 that the potential of the terminal 61 is at a given potential (band gap voltage)

or lower, an H signal is inputted to the reset terminal (R) of the RS flip-flop 43 via an OR circuit 36 and the switching element 1 is turned off. At this point of time, a switch 45 is turned on and charging is started on the capacitor externally connected to the terminal 61.

When it is detected by a comparator 37 that the potential of the terminal 61 increases higher than a given voltage (at a heavy load: about 2.5 V) or the voltage (at a light load) obtained by voltage conversion of the IV converter 27, a P-type MOSFET 39 is turned on by the output signal of the comparator 37, the potential of the terminal 61 is placed into a high-side forced clamping state, and the terminal 61 is fixed at a certain voltage. Thereafter, when the output signal of the one-shot pulse generation circuit 33 is inputted to the OR circuit 34, the switching element 1 is turned on.

In this way, the on/off period of the switching element 1 is determined by the output voltage of the IV converter 27, the output voltage being internally subjected to voltage conversion by means of current fed from the control terminal 59, and the output signal of the one-shot pulse generation circuit 33 for generating a one-shot pulse from the output of the transformer reset detection circuit 32 which detects the voltage of the terminal 61 and the bias winding voltage of the transformer to determine the timing of turning on the switching element 1. Further, an operating frequency of the switching element is determined according to a capacity value of the capacitor externally attached to the terminal 61.

Moreover, a capacitor is connected from the outside of the semiconductor device 62 to the terminal 57 for detecting remote on/off. In the case of a heavy load, a P-type MOSFET 12 is turned on by the output Timer of an AND circuit 29, and current is charged, by a constant-current source 11, to the capacitor externally attached to the terminal 57. When an overcurrent protection circuit including an overcurrent protection detecting comparator 48 is operated, a P-type MOSFET 14 is turned on by the output OC of an AND circuit 50 and current is similarly charged, by a constant-current source 13, to the capacitor externally attached to the terminal 57.

When an overloading state or a state of overcurrent protection continues, the capacitor connected to the terminal 57 is increased in potential, an overload/overcurrent abnormality protection circuit 16 causes the NAND circuit 20 to output a signal to the set terminal (S) of the RS flip-flop 21, so that the operation of the switching element 1 is stopped. A return is made from overload protection and overcurrent protection is made when the restart trigger signal 22 is outputted.

FIG. 8 is a circuit diagram showing an example of the clamping circuit 26, the IV converter 27, and a soft start generation circuit 25 that are connected to the control terminal 59. In FIG. 8, the clamping circuit 26 is constituted of a constant-current source 209, a resistor 211, an NPN type bipolar transistor 210, and N-type MOSFETs 212 and 213. The control terminal 59 is set at a given potential. The IV converter 27 is constituted of a constant voltage source 201, an NPN type bipolar transistor 202, a resistor 203, and an N-type MOSFET 206.

A constant-current source 215 limits current when the terminal 59 shorts out with the ground. A constant-current source 218 is provided to make negligible dark current on a photocoupler which is externally attached to the control terminal 59.

The soft start generation circuit 25 is constituted of a P-type MOSFET 219, an N-type MOSFET 220, a resistor 221, a capacitor 222, and a start signal.

Regarding a part surrounding the IV converter 27 configured thus, explanation will be made on operations which are simply divided for a heavy load and a light load. Typical soft start is used and thus the explanation thereof is omitted.

After startup, since the start signal is at L level, an N-type MOSFET 220 is turned off and a P-type MOSFET 219 is turned on. First, in the case of a heavy load, current fed from the control terminal 59 is extremely low, current fed to a P-type MOSFET 216 is reduced, and current fed by a mirror circuit to a P-type MOSFET 217 is also reduced. Hence, current fed to the mirror circuit is reduced, the mirror circuit being constituted of an N-type MOSFET 207 and an N-type MOSFET 208, so that current fed by a constant-current source 204 is mainly applied to an N-type MOSFET 205.

Therefore, a large amount of current is applied to the N-type MOSFET 206 by the mirror circuit. Assuming that the current value is I, the constant voltage source 201 has a voltage value of V, the NPN type bipolar transistor 202 has a VF value of VF, and the resistor 203 has a resistance of R, the IV converter 27 has an output value VFB expressed by the equation below.

$$VFB = V - VF - R \times I \qquad \text{(Equation 1)}$$

In this equation, VFB has a small value.

However, in the case of a light load, a large amount of current is fed from the control terminal 59 and thus the current I applied to the N-type MOSFET 206 finally has a small value. Therefore, in the case of a light load, VFB expressed by (Equation 1) is changed to a large value.

FIG. 9 is a circuit block diagram showing a structural example of a switching power supply constituted of the conventional switching control section (as a semiconductor device) 62 shown in FIG. 7. In the switching power supply, a commercial alternating-current power supply is rectified by a rectifier 101 such as a diode bridge and is smoothed by an input capacitor 102, so that a direct-current voltage VIN is obtained and is fed to a transformer 103 for converting power.

The transformer 103 has a primary winding 103a, a secondary winding 103b, and a tertiary winding (bias winding) 103c. The direct-current voltage VIN is fed to the primary winding 103a.

The direct-current voltage fed to the primary winding 103a of the transformer 103 is switched by the switching element 1 of the semiconductor device 62. Then, alternating current is drawn to the secondary winding 103b of the transformer 103 by the switching operation of the switching element 1.

The alternating current drawn to the secondary winding 103b of the transformer 103 is rectified and smoothed by a diode 104 and a capacitor 105 that are connected to the secondary winding 103b, and the alternating current is applied as the direct-current power of the output voltage VO to a load 109.

For example, an output voltage detection circuit 106 constituted of an LED 107 and a Zener diode 108 is connected across the capacitor 105 and outputs a feedback signal for stabilizing the output voltage VO to a phototransistor 110 on the primary side, the phototransistor 110 being connected to the control terminal 59 of the semiconductor device 62.

Further, the tertiary winding (bias winding) 103c of the transformer 103 is connected to the terminal 55 for detecting starting voltage and overvoltage, via a diode 113 and the terminal 60 for detecting a bias winding voltage.

Capacitors 111 and 112 prevent the terminal 55 and the terminal 56 for the power supply voltage of the control circuit from rapidly decreasing, that is, the capacitors 111 and 112 stabilize the terminals. A capacitor 114 connected to the terminal 57 stops the switching element 1 in a latch mode in the event of overload and overcurrent.

Further, a resistor 115 for setting a heavy load level is connected to the terminal 58, and the capacitor connected to the terminal 61 determines a switching frequency of the switching element 1. A capacitor 117 connecting the terminals 53 and 54 for the input/output of the switching element 1 determines a period and magnitude of resonance with the transformer 103.

The following will discuss the operations of the switching control section and switching power supply configured thus.

When an alternating-current power supply is inputted from a commercial power supply to the rectifier 101, rectification and smoothing are performed by the rectifier 101 and the capacitor 102 and conversion is made to the direct-current voltage VIN. The direct-current voltage VIN is applied to the primary winding 103*a* of the transformer 103.

When the direct-current voltage VIN is equal to or higher than a given value, charging current is fed to the capacitors 111 and 112 via the regulator 6 in the semiconductor device 62, the voltage of the power supply terminal 56 in the semiconductor device 62 reaches a given level, and the internal circuit is started. When the voltage of the terminal 55 reaches the starting voltage set by the start/stop comparator 7, control is started on the switching operation of the switching element 1.

Before startup, the terminal 61 is fixed on a certain potential by the high-side forcing clamp 38. In response to a signal from the start/stop comparator 7, a start pulse is generated from the start pulse generation circuit 19 and the switching element 1 is turned on. At this point of time, the switch 46 is turned on, electrical charge on a capacitor 116 connected to the terminal 61 is discharged by the constant-current source 47, and the terminal 61 gradually decreases in potential. Since the direct-current output voltage VO on the secondary side is low upon startup, current is not fed to the Zener diode 108 of the output voltage detection circuit 106 and thus current is not fed to the phototransistor 110.

However, in the control terminal 59 of the semiconductor device 62, charging current is fed to the capacitor 222 from the soft start generation circuit 25 shown in FIG. 8. The voltage VFB having been subjected to IV conversion by the IV converter 27 has a high value according to (Equation 1). When the voltage of the terminal 61 becomes lower than the voltage VFB, the N-type MOSFET 42 is turned on by the output signal of the comparator 40 and the electrical charge of the capacitor 116 connected to the terminal 61 is forcibly discharged.

When it is detected by the comparator 35 that the voltage of the terminal 61 is equal to or lower than a certain potential (band gap voltage), an H signal is inputted to the reset terminal (R) of the RS flip-flop 43 and the switching element 1 is turned off. At this point of time, the switch 45 is turned on and the charging of constant current is started from a constant-current source 44 to the capacitor 116 connected to the terminal 61. When the comparator 37 detects a voltage higher than a certain voltage (at a heavy load: about 2.5 V) or the VFB voltage (at a light load), the P-type MOSFET 39 is turned on and the potential of the terminal 61 is fixed at a certain potential, which is internally set, by the high-side forcing clamp 38.

Thereafter, according to a resonating operation determined by the leakage inductance of the transformer 103 and the capacities of the capacitor 117 and the switching element 1, when the voltage of the tertiary winding (bias winding) 103*c* of the transformer 103 changes from positive to negative, that is, when the input terminal 53 of the switching element 1 decreases in voltage, the output of the one-shot pulse generation circuit 33 is inputted in a state of high level to the set terminal (S) of the RS flip-flop 43 via the OR circuit 34 and the AND circuit 68 by the transformer reset detection circuit 32, and the switching element 1 is turned on.

The above-described switching operation is repeated and the direct-current output voltage VO is increased. At a voltage or higher than the voltage set by the output voltage detection circuit 106, the LED 107 is brought into conduction and thus current is fed to the phototransistor 110. Then, current from the phototransistor 110, that is, current from the control terminal 59 of the semiconductor device 62 is fed and the on duty of the switching element 1 is changed to a proper state.

Namely, the switching operation of the switching element 1 is turned on by a one-shot pulse which is the output signal of the transformer reset detection circuit 32 and is outputted from the one-shot pulse generation circuit 33, and the on-duty of the switching element 1 is determined by current fed from the control terminal 59.

That is, as shown in the time chart of FIG. 10, regarding current fed to the load 109, a light load (FIG. 10(*b*)) has a shorter period for feeding current to the switching element 1, a heavy load (FIG. 10(*a*)) has a longer period for feeding current to the switching element 1. In this way, the semiconductor device 62 performs control so that the on duty of the switching element 1 is changed according to a current fed to the load 109 of the switching power supply.

Further, the timing of turning on the switching element 1 is set so that output is performed when the switching element 1 has the lowest input voltage during the resonating operation, so that switching loss hardly occurs when the switching element 1 is turned on. That is, a partial resonating operation is performed so that switching loss is negligible when the switching element 1 is turned on.

With this operation, it is possible to achieve high efficiency or low noise in a normal operation.

In the conventional switching power supply, although current fed to the switching element is reduced at a low load in a standby state and so on, current has to be fed by the switching operation of the switching element via the transformer to the internal circuit of the switching control circuit of the switching control section, which is constituted of the semiconductor device, and current fed to the switching element cannot be set at 0. Thus, a certain amount of current is applied even at no load.

Therefore, even at no load, a loss is generated by the switching operation of the switching element 1. A lighter load increases a loss on the switching element 1 and reduces efficiency on the power supply. Thus, it is not possible to meet the need for lower power consumption during the standby mode of the power supply.

DISCLOSURE OF THE INVENTION

The present invention is devised to solve the above conventional problems and has as its object the provision of a switching power supply which reduces a switching operation period on standby, reduces current loss during a switching operation, reducing power consumption on standby for output from a power supply, and improves power supply efficiency.

In order to solve the above problems, a switching power supply according to the first aspect of the present invention, comprises a switching element for performing a switching operation by turning on/off direct-current voltage inputted to a primary side of a transformer, a control circuit for controlling the switching operation according to a change in direct-current output voltage generated on a secondary side via the transformer by the switching operation, and a transmission circuit for transmitting current proportionate to the direct-current output voltage to the control circuit so as to permit the control circuit to control the switching operation, the switching operation being controlled by the control circuit to stabilize the direct-current output voltage, wherein the control circuit comprises an IV converter which is connected to the control terminal of the control circuit and converts, into voltage, current of the control terminal from the transmission circuit, a comparator for determining a normal load operation or a light load operation for the switching operation depending upon the converted voltage level of the IV converter, and a standby detection circuit which stops the switching operation when the converted voltage level of the IV converter is higher than a standby detection upper limit voltage being set higher than a predetermined reference voltage according to the light load operation, and resumes the switching operation when the stop makes the converted voltage level of the IV converter lower than a standby detection lower limit voltage being reset lower than the predetermined reference voltage according to the stop of the switching operation.

Further, a switching power supply according to the second aspect of the present invention is the switching power supply according to the first aspect, wherein the standby detection circuit comprises a reference voltage source for outputting the standby detection upper limit voltage or the standby detection lower limit voltage according to an operating state of the load, the upper limit voltage or lower limit voltage being compared with the converted voltage level of the IV converter, and a standby detection comparator for comparing the output voltage of the reference voltage source and the converted voltage of the IV converter, the standby detection circuit changing the output voltage of the reference voltage source into the standby detection upper limit voltage and the standby detection lower limit voltage according to the output signal of the standby detection comparator.

Moreover, a switching power supply according to the third aspect of the present invention is the switching power supply according to the second aspect, further comprising a detected voltage changing terminal for arbitrarily setting the output voltage from the reference voltage source of the standby detection circuit.

Besides, a switching power supply according to the fourth aspect of the present invention is the switching power supply according to the third aspect, further comprising a resistor connecting the detected voltage changing terminal and the ground.

Further, a switching power supply according to the firth aspect of the present invention is the switching power supply according to any one of the first to fourth aspects, wherein the switching element and the control circuit are integrated on the same semiconductor substrate as a one-chip semiconductor device.

As described above, the present invention comprises a standby detection circuit for stopping and resuming the switching operation repeatedly turning on/off performed by the switching element in a standby state. Thus, the standby detection circuit can stop the switching operation of the switching element at the start of a standby mode where the output voltage of the IV converter exceeds the standby detection upper limit voltage from the reference voltage source, and the standby detection circuit can resume the switching operation of the switching element when the output voltage of the IV converter is reduced by the stop along with the power supply output voltage and is lower than the standby detection lower limit voltage from the reference voltage source.

Hence, it is possible to reduce a switching period in a standby mode, reduce current loss during the switching operation, reduce the standby power consumption of the power supply output, and improve power supply efficiency.

Further, the detected voltage changing unit is provided to arbitrarily set the standby detection voltage, so that load current for stopping and resuming the switching operation of the switching element can be optimally set according to a load required in the standby mode.

Thus, it is possible to reduce current loss when the switching operation is stopped and resumed during a standby mode, reduce the standby power consumption of the power supply output, and improve power supply efficiency.

DESCRIPTION OF THE EMBODIMENT

A switching power supply according to the embodiment of the present invention will be specifically described below with reference to the accompanying drawings.

Figure 1:
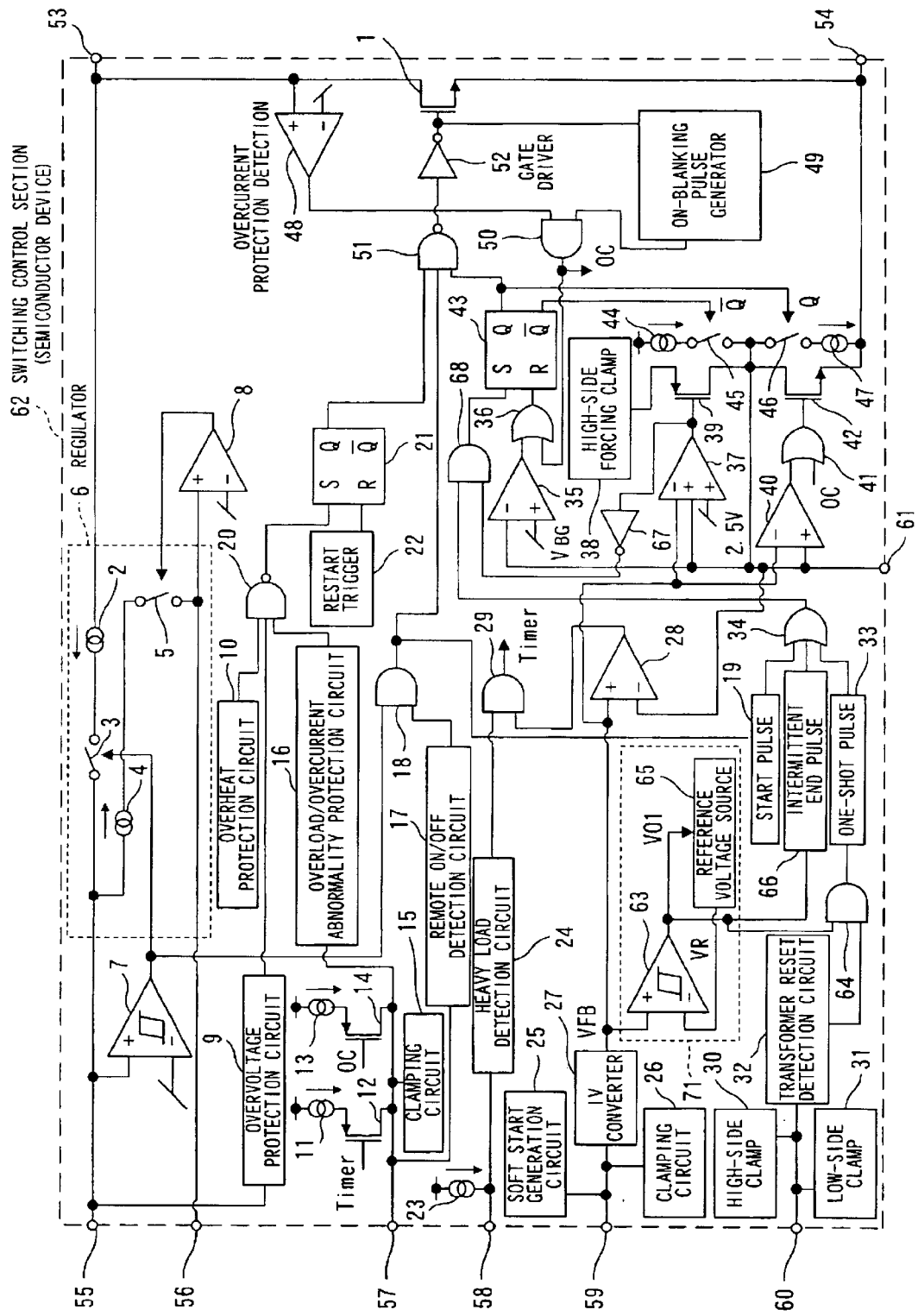
FIG. 1 is a block diagram showing a structural example of a switching control section in a switching power supply according to an embodiment of the present invention.
Figure 7:
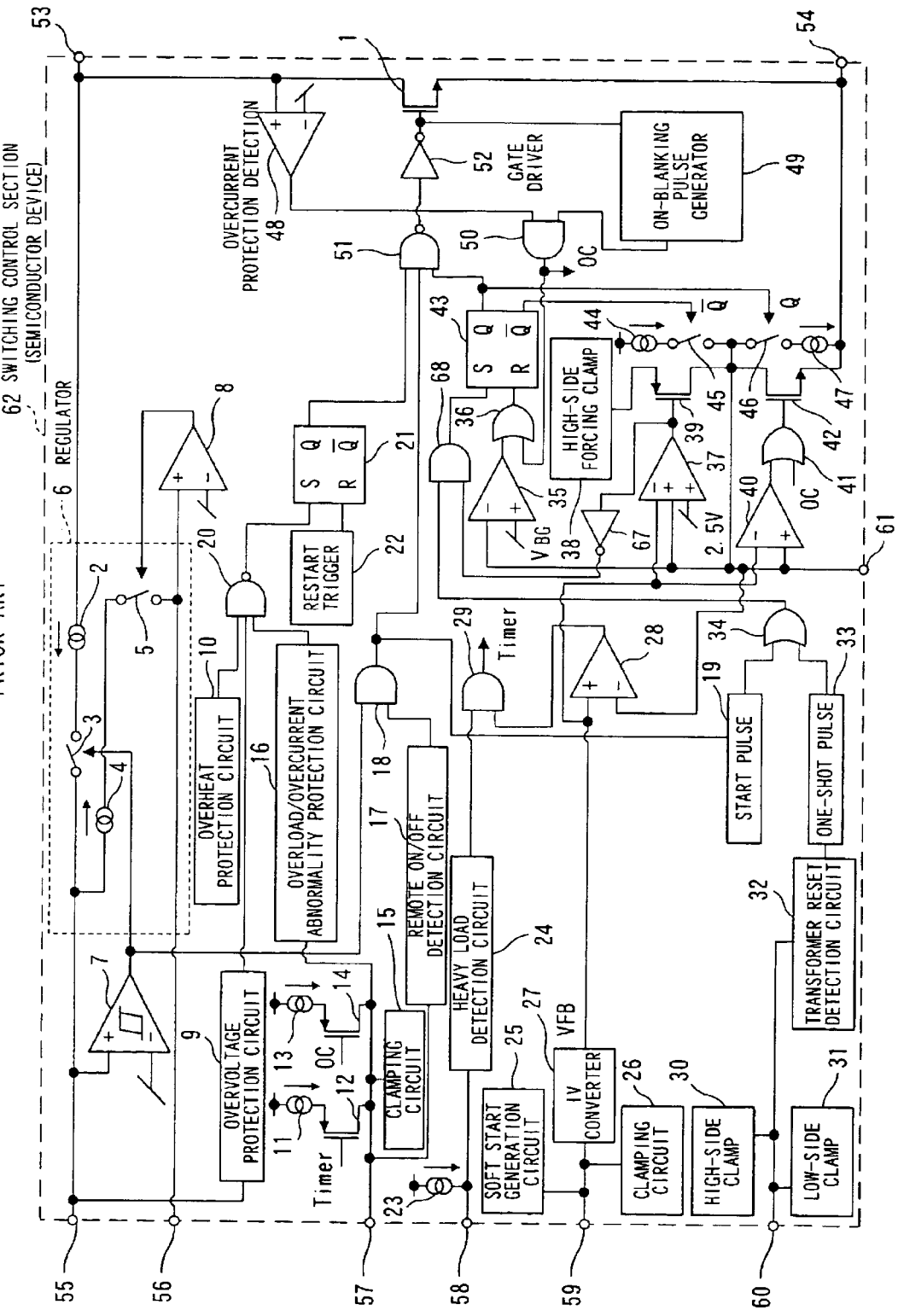
FIG. 7 is a circuit block diagram showing a structural example of a switching control section in a conventional switching power supply.
Figure 8:
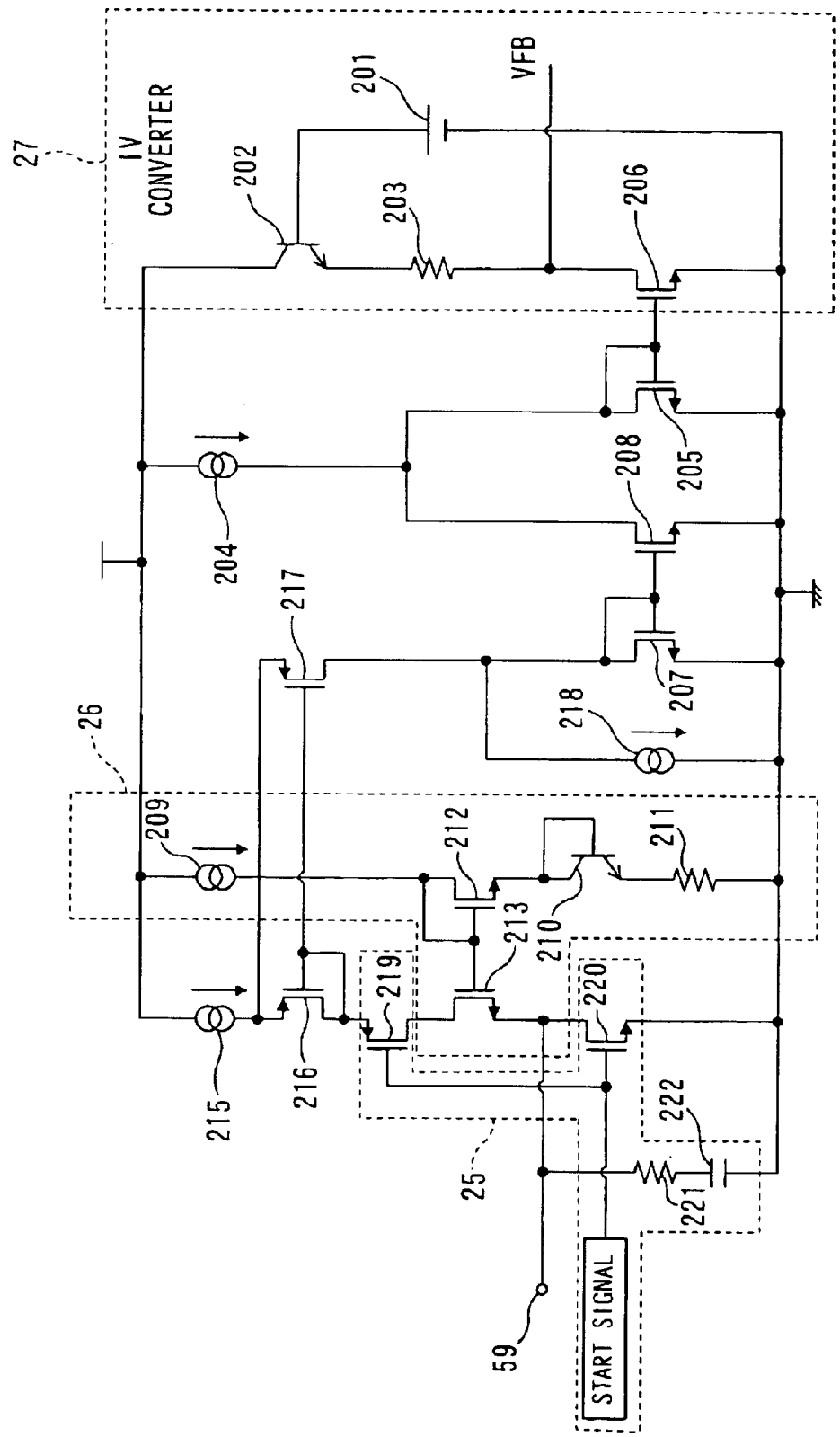
FIG. 8 is a circuit diagram showing a configuration around an IV converter in the conventional switching power supply.

FIG. 1 is a circuit block diagram showing a structural example of a switching control section in the switching power supply according to the present embodiment. The same constituent elements as the switching control section of FIG. 7 are indicated by the same reference numerals and the explanation thereof is omitted. As with the switching control section of FIG. 7, a switching control section 62 of FIG. 1 is constituted as a semiconductor device (hereinafter, the switching control section will be indicated as a semiconductor device) and comprises a standby detection circuit 71 supplied with the output of an IV converter 27 for performing voltage conversion on current fed from a control terminal 59.

The standby detection circuit 71 comprises a standby detection comparator 63. An output voltage VFB outputted from the IV converter 27 is fed as an input to the plus(+) terminal of the standby detection comparator 63 and a reference voltage VR outputted from a reference voltage source 65 is fed as an input to the minus(−) terminal. The standby detection comparator 63 compares the inputted output voltage VFB of the IV converter 27 with the reference voltage VR. When the output voltage VFB exceeds the reference voltage VR, the standby detection comparator 63 outputs a predetermined output signal VO1 to an AND circuit 64.

The output signal VO1 of the standby detection comparator 63 is also fed to the reference voltage source 65. The reference voltage source 65 changes its output voltage VR in response to the output signal VO1 from the standby detection comparator 63.

On the other hand, the AND circuit 64 is supplied with a clock signal as another input. A transformer reset detection circuit 32 detects a voltage of a transformer reset detecting terminal 60 to output the clock signal. The output of the AND circuit 64 is fed to a one-shot pulse generating circuit 33.

When a standby state is detected by the standby detection circuit 71, that is, when a switching operation of a switching element 1 is stopped, the amplitude of a resonating operation is reduced according to the stop time and thus a transformer reset signal may not be detected. Thus, the one-shot pulse 33 is stopped from operating beforehand.

The output voltage VO1 of the standby detection comparator 63 is also inputted to an intermittent (stop) end pulse generation circuit 66. After a stop period is ended, the output of the intermittent end pulse generation circuit 66 is inputted to an OR circuit 34 and the output signal of the OR circuit 34 is inputted as the set signal of an RS flip-flop 43 via an AND circuit 68. An output signal from the Q terminal of the RS flip-flop 43 is inputted to a NAND circuit 51 and the output of the NAND circuit 51 is outputted to the gate of the switching element 1 through a gate driver 52.

In this way, when a standby state is detected by the standby detection comparator 63, the operation of the transformer reset detection circuit 32 is stopped from working and switching is controlled so that the switching operation of the switching element 1 is resumed by the output signal of the intermittent end pulse generation circuit 66 during a standby state.

Figure 2:
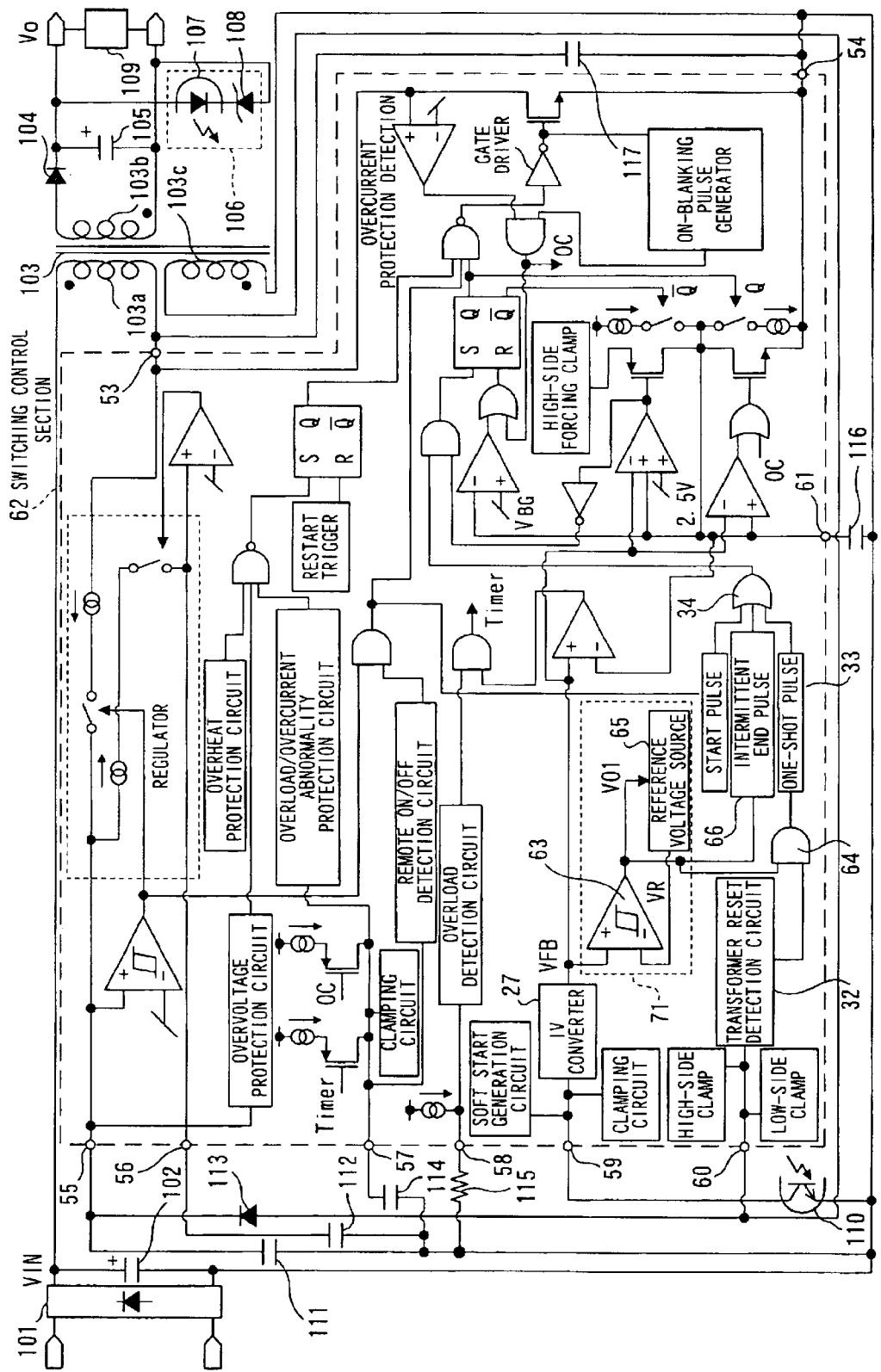
FIG. 2 is a circuit block diagram showing a structural example of the switching power supply according to the embodiment of the present invention.
Figure 9:
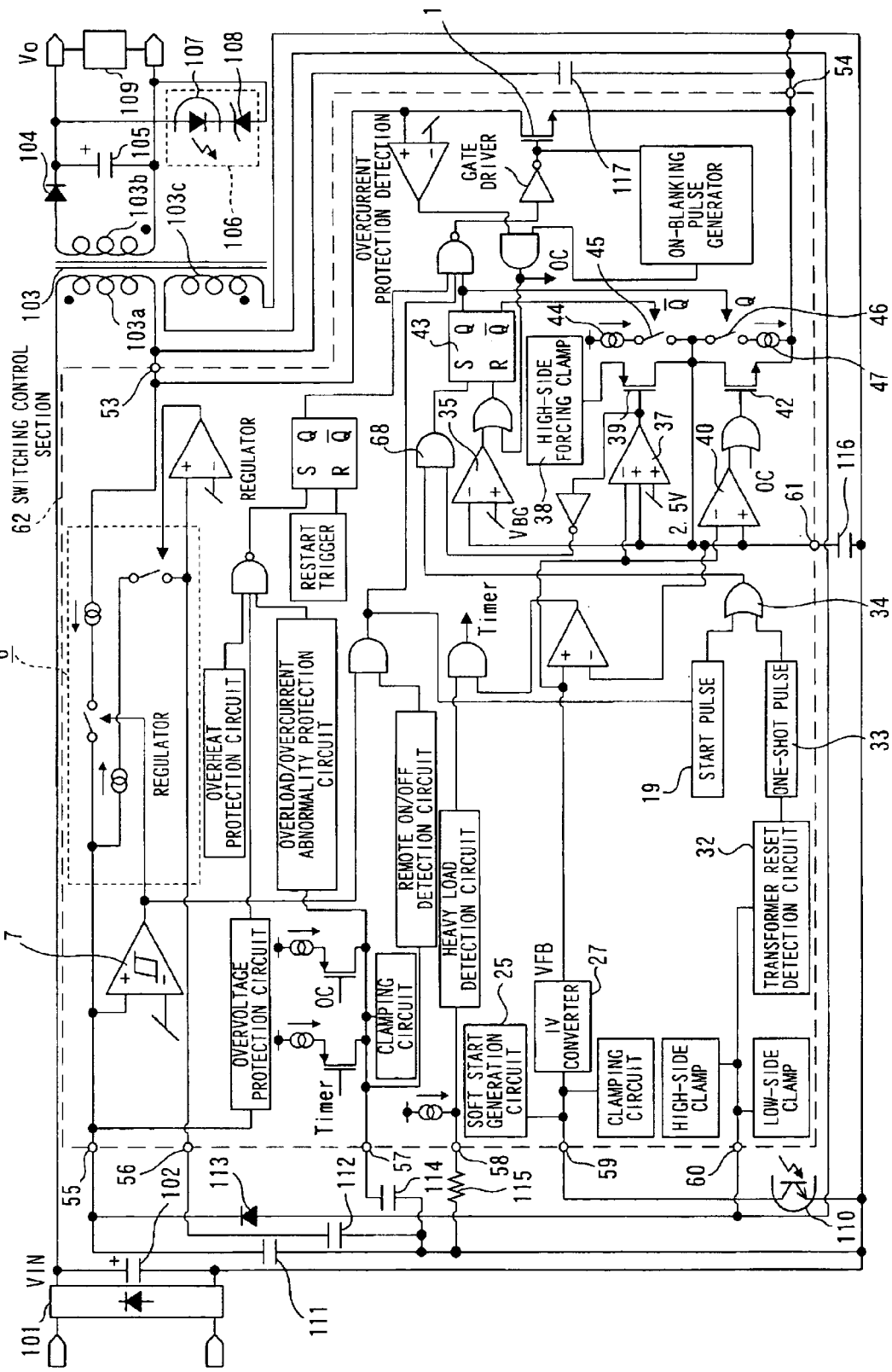
FIG. 9 is a circuit block diagram showing a structural example of the conventional switching power supply.
Figure 10:
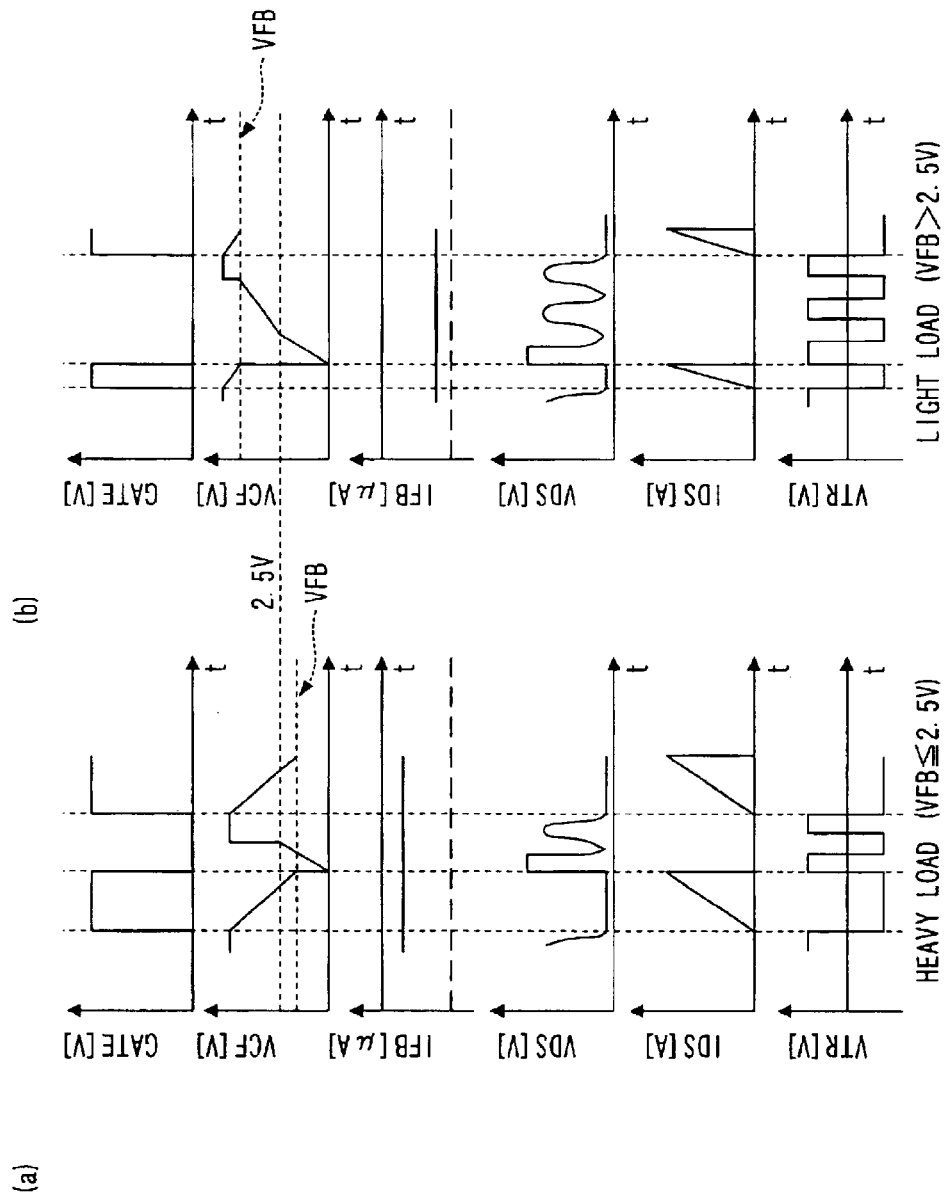
FIG. 10 is a time chart showing an operation of the conventional switching power supply.

FIG. 2 is a circuit block diagram showing a structural example of the switching power supply according to the present embodiment. The switching power supply is composed of a semiconductor device which constitutes the switching control section of FIG. 1. Here, the same constituent elements as the switching power supply of FIG. 9 are indicated by the same reference numerals and the explanation thereof is omitted. FIG. 1 is different from FIG. 9 only in the internal configuration of a semiconductor device 62. All the other configurations are the same as FIG. 9.

Figure 3:
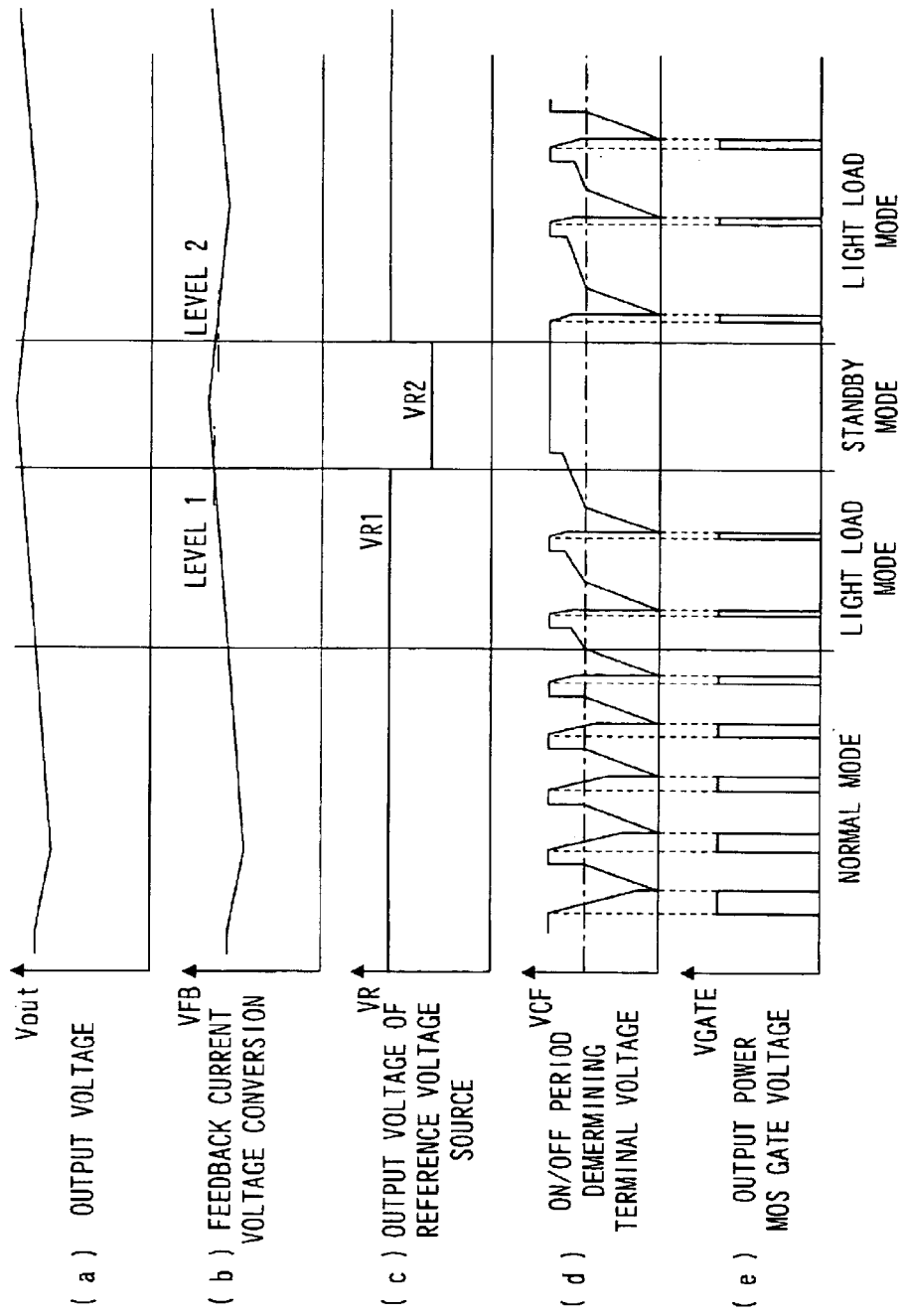
FIG. 3 is a time chart showing an operation of the switching power supply according to the embodiment.

Referring to the time chart of FIG. 3, the following will discuss the operations of the switching power supply configured thus and the operations of the switching power supply when a light load is applied.

The standby detection comparator 63 compares the output voltage VFB of the IV converter 27 with the output voltage VR of the reference voltage source 65. The output voltage VFB is obtained by performing voltage conversion on current fed from the control terminal 59. As shown in FIG. 3(c), the output voltage VR of the reference voltage source 65 is first set at a standby detection upper limit voltage VR1. During a standby state in which lower current is fed to a load 109 connected to the output of the switching power supply, when current fed to the load is reduced, the output voltage VO is increased and current fed to a phototransistor 110 from an LED 107 is increased as shown in FIG. 3(a). Since current applied from the control terminal 59 is increased due to the increased current, a converted voltage VFB from the IV converter 27 is increased as shown in FIG. 3(b).

Then, when the converted voltage VFB from the IV converter 27 exceeds the standby detection upper limit voltage VR1, a standby detection state (standby mode) arises and the output signal VO1 of the standby detection comparator 63 changes from high level to low level. Thus, the output of the AND circuit 64 is set at low level and the signal of the one-shot pulse generation circuit 33 is not outputted, so that the switching operation of the switching element 1 is stopped. At the same time, as shown in FIG. 3(c), the output voltage VR of the reference voltage source 65 is changed from the standby detection upper limit voltage VR1 to a standby detection lower limit voltage VR2 in response to the output signal VO1 of the standby detection comparator 63.

Figure 4:
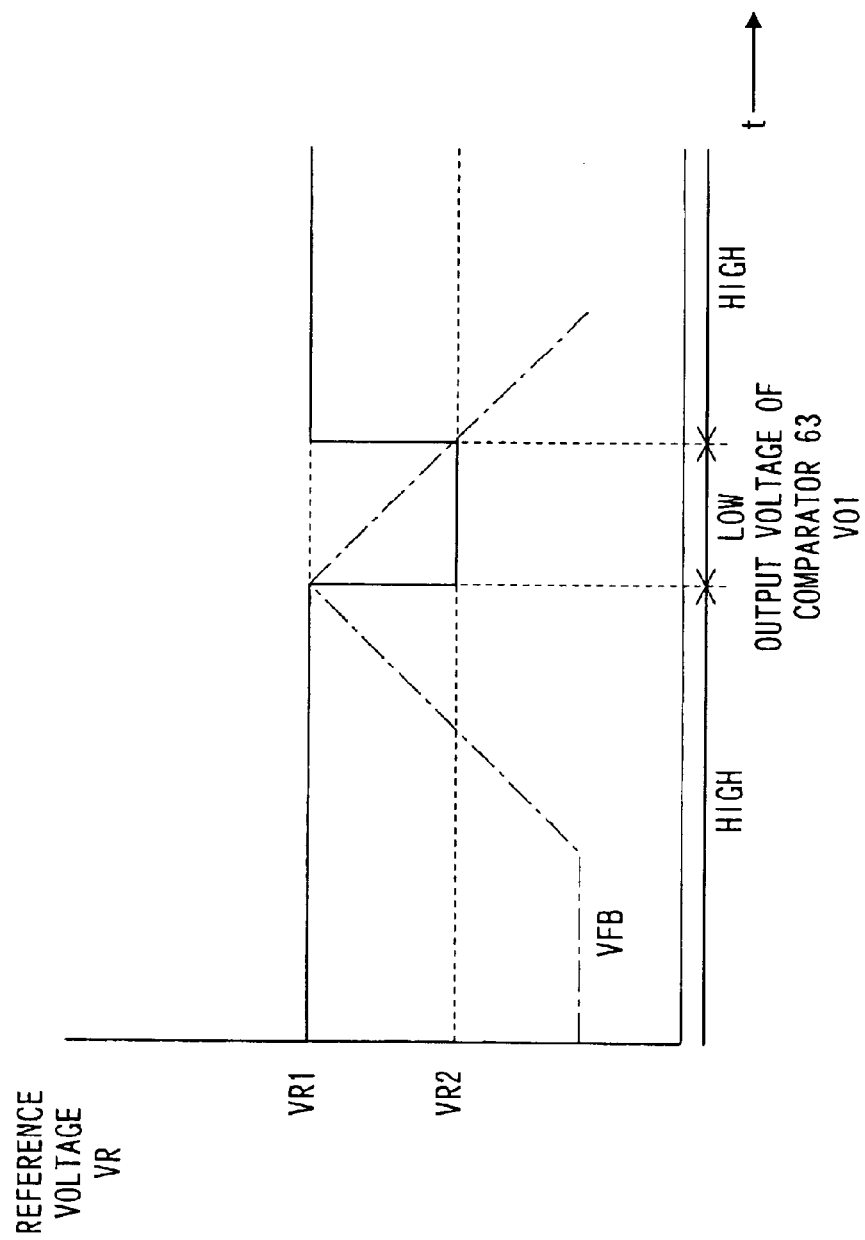
FIG. 4 is a time chart showing an operation of a reference voltage source in the switching power supply according to the embodiment.

Subsequently, when the switching operation of the switching element 1 is stopped and the switching element 1 is turned off, current is not fed to the switching element 1. Power is not fed to the load 109 and thus the output voltage VO to the load 109 gradually decreases. Therefore, current from the phototransistor 110, that is, current applied from the control terminal 59 of the semiconductor device 62 is reduced, thereby gradually reducing the output voltage VFB of the IV converter 27. Since the output voltage of the reference voltage source 65 is set at the standby detection lower limit voltage VR2 which is lower than the standby detection upper limit voltage VR1, as shown in FIG. 4, the switching operation of the switching element 1 is not resumed immediately.

When the output voltage VO to the load 109 is further reduced and the output voltage VFB of the IV converter 27 becomes lower than the standby detection lower limit voltage VR2, the output signal VO1 of the standby detection comparator 63 is set at high level. In response to the signal, the output signal of the intermittent (stop) end pulse generation circuit 66 is inputted to the OR circuit 34. At the same time, the operation of the transformer reset detection circuit 32, which has been stopped by the AND circuit 64, is permitted to work on the one-shot pulse generation circuit 33. The output of the one-shot pulse generation circuit 33 resumes the turning on/off of the switching element 1. At the same time, the output voltage VR of the reference voltage source 65 is changed from the standby detection lower limit voltage VR2 in the standby mode to the standby detection upper limit voltage VR1 in a light load mode.

When the switching operation of the switching element 1 is resumed, the on duty of the switching element 1 is wider than current values obtained at the detection of the standby state. Thus, excessive power is fed to the load 109, the output voltage VO to the load is increased again, and the output voltage VFB of the IV converter 27 is increased. Then, when a standby state is detected again, the switching operation for repeatedly turning on/off of the switching element 1 is stopped.

In this way, the output voltage VR from the reference voltage source 65 changes from the standby detection upper limit voltage VR1 to the standby detection lower limit voltage VR2 when the standby state is detected. Thus, during the standby mode for detecting a standby state, the switching control for repeatedly turning on/off the switching element 1 is placed in intermittent resonance for repeating stop and resumption.

The output voltage VO to the load 109 is reduced during the stop period of the intermittent resonance. A degree of the reduction depends upon current fed to the load 109. That is, the lower current to the load 109, the output voltage VO to the load 109 decreases at a more mild pace, and the lower current to the load 109, the stop period of intermittent resonance is longer. Thus, the longer standby state, the switching operation of the switching element 1 is reduced.

Figure 5:
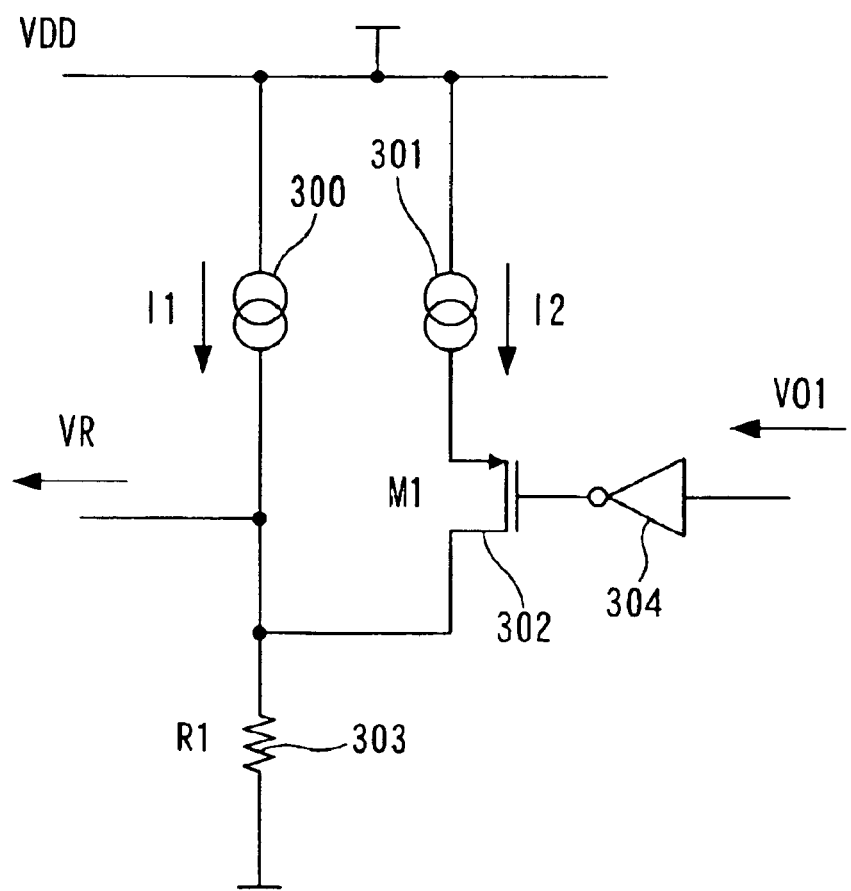
FIG. 5 is a circuit diagram showing a structural example of the reference voltage source in the switching power supply according to the embodiment.

FIG. 5 is a circuit diagram showing a structural example of a reference voltage source 65 of the standby detection circuit 71 in the switching power supply according to the present embodiment. The reference power source 65 is constituted of a constant-current source 300 for determining the output voltage VR, a constant-current source 301, a resistor 303, a switching element 302 such as a P-type MOSFET, and an inverter circuit 304.

The constant-current source 300 feeds a constant current I1 and is connected to the resistor 303. The constant-current source 301 feeds a constant current I2 and is connected to the resistor 303 via the switching element 302. To an input terminal such as the gate of the switching element 302, the output signal VO1 of the standby detection comparator 63 is inputted via the inverter circuit 304. Further, voltage generated by the constant-current source 300, the constant-current source 301, and the resistor 303 is outputted as the output voltage VR of the reference voltage source 65 and is inputted to the minus input of the standby detection comparator 63.

The following will discuss the operations of the reference voltage source 65 configured thus.

Before a standby state is detected, the output signal VO1 of the standby detection comparator 63 is set at high level and thus the switching element 302 is turned on. Therefore, the output signal VR of the reference voltage source 65 at this point of time, that is, the standby detection upper limit voltage VR1 is expressed by the equation below.

$$VR = R1 \times (I1 + I2) = VR1 \qquad \text{(Equation 2)}$$

On the other hand, when a standby state is detected, the output signal VO1 of the standby detection comparator 63 is set at low level, so that the switching element 302 is turned off and current I2 fed from the constant-current source 301 does not pass through the resistor 303. Therefore, the output signal VR of the reference voltage source 65 at this point of time, that is, the standby detection lower limit voltage VR2 is expressed by the equation below.

$$VR = R1 \times I1 = VR2 \qquad \text{(Equation 3)}$$

In this way, the output voltage VR of the reference voltage source 65 acts as the standby detection upper limit voltage VR1 or the standby detection lower limit voltage VR2 according to the output voltage VO1 of the standby detection comparator 63, so that intermittent resonance can be generated during a standby state.

In the present embodiment, a constant-current value for setting an output voltage of the reference voltage source 65 is changed according to the output signal VO1 of the standby detection comparator 63. A resistance value for setting an output voltage of the reference voltage source 65 may be changed according to the output signal VO1 of the standby detection comparator 63.

Figure 6:
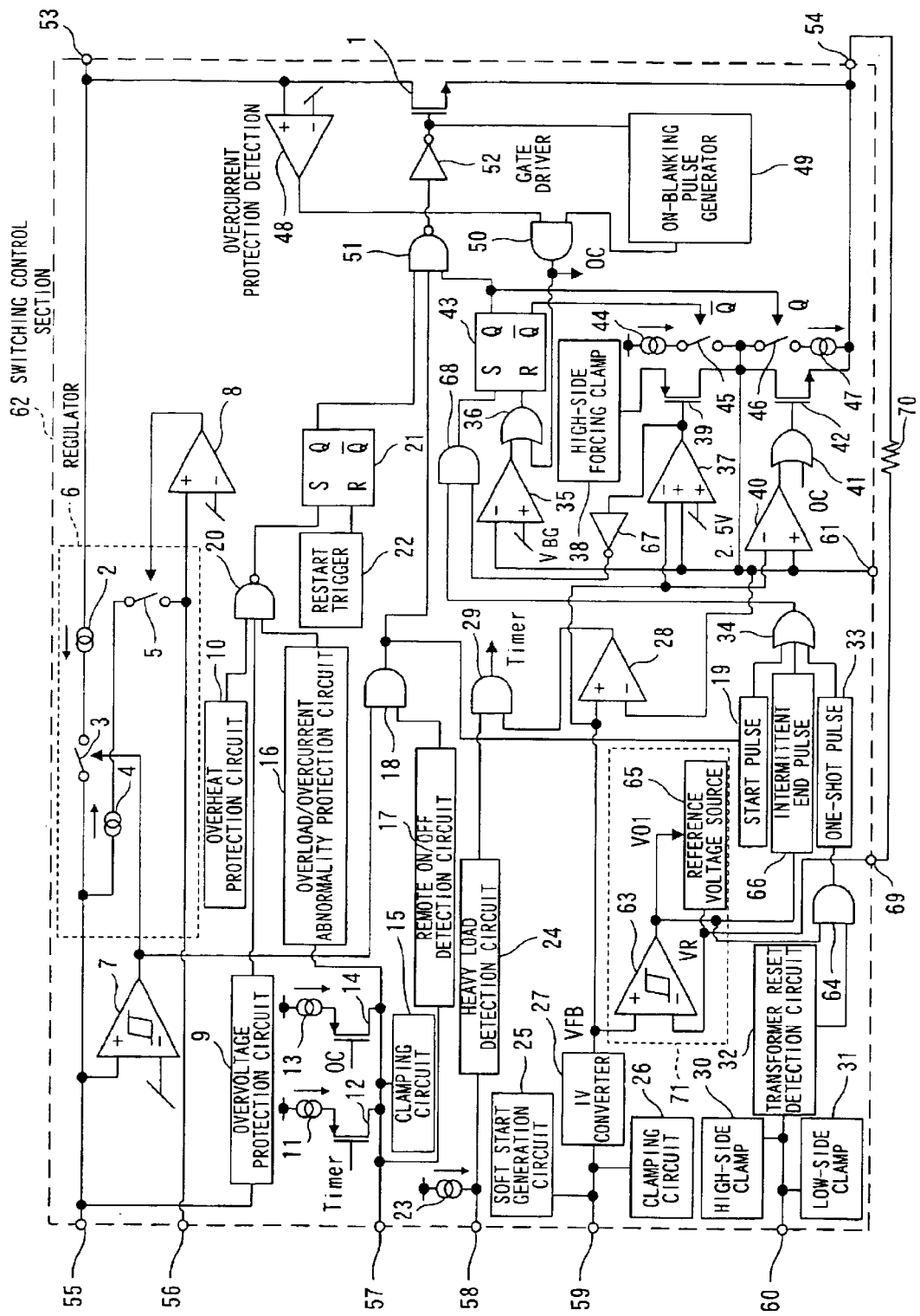
FIG. 6 is a circuit block diagram showing another structural example of the switching control section in the switching power supply according to the embodiment.

FIG. 6 is a circuit block diagram showing another structural example of the semiconductor device (switching control section) in the switching power supply according to the present embodiment. The semiconductor device comprises a terminal 69 for arbitrarily setting a standby detection voltage. An external resistor 70 for adjusting a standby detection voltage can be connected to the outside. The resistor 70 serves as a detection voltage changing unit. Other configurations are similar to that of the switching control section shown in FIG. 1.

The resistor 70 for adjusting a standby detection voltage is provided between the minus terminal of the standby detection comparator 63 and the reference voltage source 65 to adjust the reference voltage VR outputted from the reference voltage source 65. By changing the value of the resistor 70, standby detection voltage inputted to the minus terminal of the standby detection comparator 63 is adjusted.

In this way, the resistor 70 for adjusting standby detection voltage is provided to arbitrarily adjust the standby detection voltage VR, so that a load current for stopping and resuming the switching operation of the switching element 1 can be optimally adjusted according to a load required in a standby state.

In the present embodiment, three modes of a normal mode, a light load mode, and a standby mode are switched. Control may be performed with two modes of a normal mode and a standby mode.

What is claimed is:

1. A switching power supply, comprising a switching element for performing a switching operation by turning on/off direct-current voltage inputted to a primary side of a transformer, a control circuit for controlling the switching operation according to a change in direct-current output voltage generated on a secondary side via the transformer by the switching operation, and a transmission circuit for transmitting current proportionate to the direct-current output voltage to the control circuit so as to permit the control circuit to control the switching operation, the switching operation being controlled by the control circuit to stabilize the direct-current output voltage, wherein the control circuit comprises:

an IV converter that is connected to the control terminal of the control circuit and converts, into voltage, current of the control terminal from the transmission circuit;

a comparator for determining a normal load operation or a light load operation for the switching operation depending upon a converted voltage level of the IV converter; and a standby detection circuit for stopping the switching operation when the converted voltage level of the IV converter is higher than a standby detection upper limit voltage that is set to be higher than a predetermined reference voltage according to the light load operation, and resuming the switching operation when the stopping makes the converted voltage level of the IV converter lower than a standby detection lower limit voltage that is reset to be lower than the predetermined reference voltage according to the stopping of the switching operation.

2. The switching power supply according to claim 1, wherein the standby detection circuit comprises a reference voltage source for outputting the standby detection upper limit voltage or the standby detection lower limit voltage according to an operating state of the load, the upper limit voltage or lower limit voltage being compared with the converted voltage level of the IV converter, and a standby detection comparator for comparing an output voltage of the reference voltage source and a converted voltage of the IV converter, the standby detection circuit changing the output voltage of the reference voltage source into the standby detection upper limit voltage and the standby detection lower limit voltage according to an output signal of the standby detection comparator.

3. The switching power supply according to claim 2, further comprising a detected voltage changing terminal for arbitrarily setting an output voltage from the reference voltage source of the standby detection circuit.

4. The switching power supply according to claim 3, further comprising a resistor connecting the detected voltage changing terminal and a ground.

5. The switching power supply according to claim 1, wherein the switching element and the control circuit are integrated on the same semiconductor substrate as a one-chip semiconductor device.

* * * * *